UNITED STATES PATENT OFFICE.

CARL OTTO WEBER, OF MANCHESTER, AND CHARLES FREDERICK CROSS, OF LONDON, ENGLAND, ASSIGNORS TO ISIDOR FRANKENBURG, OF SALFORD, ENGLAND.

PROCESS OF MAKING CELLULOSE ESTERS.

SPECIFICATION forming part of Letters Patent No. 632,605, dated September 5, 1899.

Application filed November 28, 1898. Serial No. 697,695. (No specimens.)

*To all whom it may concern:*

Be it known that we, CARL OTTO WEBER, chemist, residing at Greengate, Salford, Manchester, in the county of Lancaster, and CHARLES FREDERICK CROSS, analytical chemist, residing at 4 New Court, Lincoln's Inn, London, England, citizens of England, have invented certain new and useful Improvements in the Manufacture of Cellulose Esters, of which the following is a specification.

Compounds of cellulose with acetic acid have been manufactured by treating structureless cellulose with zinc or magnesium acetate, acetic anhydride, and acetyl chlorid, the reaction being moderated by addition of a diluent, such as nitrobenzene.

The present invention relates to the manufacture of compounds of cellulose with the higher monobasic fatty acids or aromatically-substituted fatty acids, thus leading to cellulose esters of these acids, such esters being either simple esters containing only one of the above-named acids or mixed esters containing any two of the above-named acids and including in this case also acetic acid.

It has been found impossible so far to produce cellulose esters of the higher fatty acids or mixed cellulose esters of these acids, including acetic acid, owing to the non-recognition of the fact that in the preparation of either of these two classes of esters the presence of an acid anhydride is not optional, as in the case of the preparation of cellulose acetate, but that a certain minimum quantity of an acid anhydride is essential if esterification is to take place at all. This minimum quantity we find to be about ten per cent. of the quantity of acid chlorid present, and it is, moreover, advantageous where the production of a mixed ester is aimed at to employ the anhydride corresponding to the acid contained in the zinc or magnesium salt which is used in the process. For this purpose one molecule of cellulose in structureless form, preferably such as that obtained in the known manner from solutions of cellulose sulphocarbonate, has added to it one molecule of the zinc or magnesium salt of any one of the fatty acids or of a mixture of zinc or magnesium salts of any of these acids. The salt or salts are preferably employed as a concentrated aqueous solution, which is added to and thoroughly mixed with the cellulose, the mixture being then dried on the water-bath. To the dried mixture are added two molecules of acid chlorid and a minimum quantity of ten per cent. of acid anhydride, these being either both derivatives of the acid contained in the zinc or magnesium salt or each of them being a derivative of any of the higher fatty acids or aromatically-substituted acids. The whole mixture of cellulose, salt, chlorid, and anhydride is heated on the water-bath until it begins to thicken, whereupon nitrobenzene is added, first in small doses, then in larger and larger quantities as the reaction proceeds. The nitrobenzene acts merely as a diluent, moderating and controlling the reaction and preventing aggregation of the product into a solid mass. Other diluents might be employed, such as homologues of nitrobenzene, or epichlor hydrin or dichlorhydrin, and the diluent should be added in such quantity that the material under reaction should not become heated above 70° centigrade. The result of the reaction is a solution from which the cellulose ester is precipitated in fine light flakes on pouring the solution into alcohol, which, as well as the diluent, can be recovered. The cellulose ester being washed retains its floculent condition, so that when dried it still consists of fine light flakes soluble in any of the solvents for cellulose acetate, as also in a number of other solvents in which cellulose acetate is insoluble. Of such acetone and ethyl acetate may be named.

The following examples illustrate the process: One hundred and sixty-two parts of cellulose, preferably that obtained from solutions of cellulose sulphocarbonate, are intimately mixed with a concentrated aqueous solution of one hundred and ninety-eight parts of magnesium butyrate and the mixture is evaporated to dryness. To this mixture two hundred and thirteen parts of butyryl chlorid and a small quantity, such as twenty-five parts, of butyric anhydride are added. After standing some time the temperature rises and the mixture begins to thicken. Nitrobenzene is then gradually added, as above directed. The total quantity employed is immaterial for the final result and depends, therefore, only upon the quantity required to give a degree of fluidity sufficient for effecting subsequent precipitation of the ester, as above described.

A mixed ester is obtained if the above mixture of one hundred and sixty-two parts of cellulose with one hundred and ninety-eight parts of magnesium butyrate is treated with two molecules of some acid chlorid other than butyryl chlorid. Treatment with one hundred and fifty-seven parts of acetyl chlorid and about twenty-five parts of either acetic or butyric anhydride yields a cellulose acetobutyrate. The reaction is otherwise conducted exactly in the manner above described.

In working with the higher fatty acids from heptylic or oenanthylic acid upward it is desirable to promote the esterification by heating the mixtures to temperatures not exceeding 90° to 100° centigrade.

The fatty acids that may be employed are the monobasic fatty acids from $C_2H_4C_2$, acetic acid up to $C_{10}H_{36}O_2$, stearic acid, and angelic, hexenoic, hybogaeic, and oleic acid, also aromatically-substituted acids, such as phenylacetic or phenylpropionic acid.

Having thus described our invention, what we claim is—

1. The method or process herein described of manufacturing esters of cellulose, which consists in mixing structureless cellulose with a salt of a fatty acid, as set forth, and treating the mixture with the acid chlorids and a minimum of ten per cent. of the anhydrides of the said acid, substantially as specified.

2. The method or process herein described of manufacturing mixed esters of cellulose, which consists in mixing structureless cellulose with a salt of a fatty acid, and treating this mixture with an acid chlorid homologous with the acid of the first-named salt, in presence of a ten per cent. minimum of an anhydride of one of the acids used, substantially as specified.

3. The method or process herein described of manufacturing esters of cellulose, which consists in mixing structureless cellulose with a salt of a fatty acid, as set forth, drying the mixture, treating the dried mixture with the acid chlorids and anhydrides of the said acid, and gradually adding a diluent, substantially as specified.

In testimony whereof we have hereunto set our hands in presence of two subscribing witnesses.

CARL OTTO WEBER.
CHARLES FREDERICK CROSS.

Witnesses to the signature of Carl Otto Weber:
ELDON ALFRED KING,
THOMAS CECIL WALKER.

Witnesses to the signature of Charles Frederick Cross:
JNO. P. M. MILLARD,
WALTER J. SKERTEN.